United States Patent [19]

Frank

[11] 4,221,580
[45] Sep. 9, 1980

[54] GLASS SHEET VACUUM MOLDING APPARATUS WITH UNIFORM RELEASE MEANS

[75] Inventor: Robert G. Frank, Murrysville, Pa.

[73] Assignee: PPG Industries, Inc., Pittsburgh, Pa.

[21] Appl. No.: 954,695

[22] Filed: Oct. 25, 1978

[51] Int. Cl.² ........................................... C03B 23/02
[52] U.S. Cl. ..................................... 65/273; 65/287; 65/349
[58] Field of Search ................. 65/273, 275, 286, 287, 65/348, 349, 350, 351

[56] References Cited

U.S. PATENT DOCUMENTS

| | | | |
|---|---|---|---|
| 1,478,126 | 12/1923 | Lewis et al. | 65/260 |
| 2,817,928 | 12/1957 | Lambert et al. | 65/287 X |
| 3,004,295 | 10/1961 | Bottoms et al. | 65/106 X |
| 3,279,906 | 10/1966 | Baker | 65/268 |
| 3,567,265 | 3/1971 | Blanding et al. | 294/65 |
| 3,607,188 | 9/1971 | Stilley | 65/106 |
| 3,634,059 | 1/1972 | Miller | 65/273 |
| 3,846,104 | 11/1974 | Seymour | 65/104 |
| 3,846,106 | 11/1974 | Seymour | 65/114 |
| 4,092,141 | 5/1978 | Frank et al. | 65/104 X |

Primary Examiner—Arthur D. Kellogg

Attorney, Agent, or Firm—Dennis G. Millman; Edward I. Mates

[57] ABSTRACT

This invention relates to improvements in handling glass sheets during shaping. Each glass sheet in turn is heated to its deformation temperature and conveyed into a glass shaping station. The glass is lifted into engagement with an upper vacuum shaping mold while hot and held against the vacuum shaping mold by vacuum as the glass lifting mechanism retracts downward. A transfer and tempering ring-like member having an outline supporting surface conforming to and slightly inside the periphery of the bent glass sheet is brought into a position below the upper vacuum shaping mold. The vacuum on the upper mold is released to deposit the shaped glass sheet on the ring-like member. In case the outline of the glass sheet is irregular, the shaped glass may become tilted as it falls toward the ring-like member and be deposited in a misaligned position relative to said ring-like member. The present invention provides means for the upper vacuum shaping mold that reduces the tendency of glass sheets of irregular outline to tilt during their transfer to the ring-like member with minimum expenditure of power to insure a non-tilting transfer.

8 Claims, 6 Drawing Figures

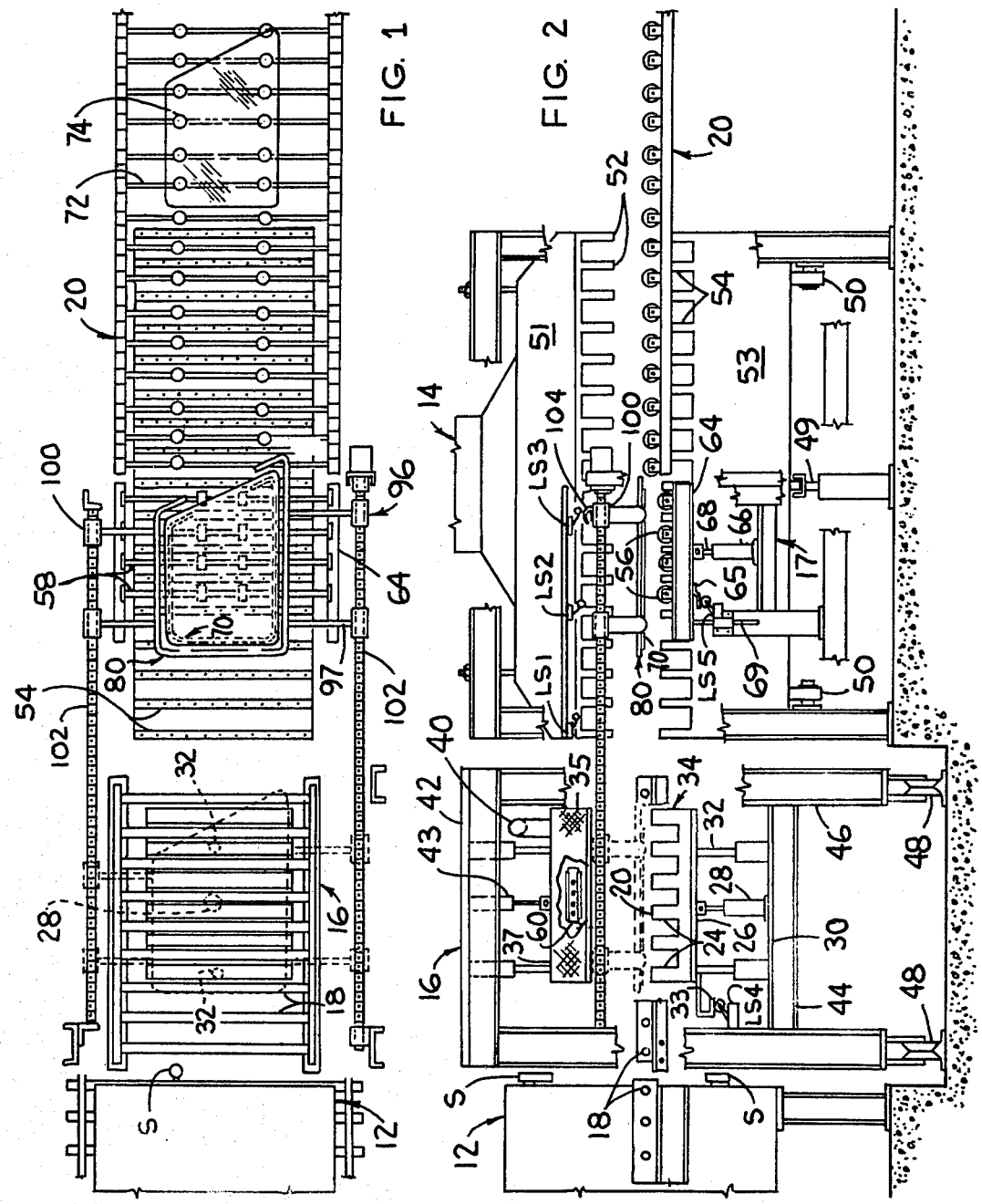

GLASS SHEET VACUUM MOLDING APPARATUS WITH UNIFORM RELEASE MEANS

RELATION TO OTHER APPLICATIONS

The subject matter of the present application is related to the subject matter of the following patent applications of Robert G. Frank all filed on the same date as the present application:

Ser. No. 954,697 for Handling Glass Sheets during Shaping and Cooling; and

Ser. No. 954,693 for Apparatus for Handling Glass Sheets during Shaping and Cooling; and Ser. No. 954,694 for Glass Sheet Tempering Apparatus, now abandoned; and Patent application Ser. No. 954,696, of Robert G. Frank, Rudy Canonaco and Richard V. Posney for Slotted Glass Sheet Shaping Mold.

BACKGROUND OF THE INVENTION

1. Field of the Invention

This invention relates to the shaping and cooling of sheets and particularly in the high speed production of bent glass sheets that are toughened by air quenching, and most particularly, for shaping and heat treating relatively thin glass sheets. However, this invention is also suitable for use in the transfer of sheets of any flexible or moldable material from an upper, shaped vacuum holding member that holds a shaped sheet by vacuum against an apertured lower shaped wall thereof to a lower supporting member disposed below the lower, apertured, shaped wall by releasing the vacuum that provides the suction support without introducing tilting of the sheet (during its transfer) of a magnitude that causes misalignment between the transferred sheet and said supporting member during its free fall from said upper shaped vacuum holding member to said lower supporting member.

Shaped glass sheets are widely used as side windows in vehicles such as automobiles or the like and, to be suitable for such application, flat glass sheets must be shaped to precisely defined curvatures dictated by the shape and outline of the frames defining the window openings into which the glass side windows are installed. It is also important that the side windows meet stringent optical requirements and that the windows be free of optical defects that would tend to interfere with the clear viewing therethrough in their viewing area. During fabrication, glass sheets intended for use as shaped windows in vehicles are subjected to thermal treatment to temper the glass for strengthening the same and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and into a shaping station where each glass sheet in turn is transferred onto a lifting member that lifts the glass sheet into engagement with a vacuum mold. The vacuum mold holds the shaped glass by suction while the lifting member retracts to below the substantially horizontal path. At about the same time, a transfer and tempering ring having an outline shape conforming to that of the glass sheet slightly inboard of its perimeter moves upstream into a position below the vacuum mold and above the lifting member. Release of the vacuum deposits the shaped glass sheet onto the tempering ring.

When prior art apparatus transferred a shaped glass sheet from the vacuum mold onto the transfer and tempering ring in misaligned or misoriented relation to the latter, the glass sheet shape would depart from required tolerances. No provision was available to remedy such a defect except to destroy the article so produced in order to avoid a customer complaint. In addition, while prior art apparatus kept improving the speed of glass sheet bending and tempering, there still remained a need for further improvement, particularly in the shaping and tempering of thinner glass sheets than those required prior to the need to supply thinner tempered glass windows for automobiles in order to lighten the vehicle, thereby reducing its rate of fuel consumption.

2. The Prior Art

U.S. Pat. No. 1,478,126 to J. A. Lewis and A. C. Crimmel discloses and claims a suction head so proportioned that it can be inserted into a mold so as to contact an article formed within the mold. When suction is applied to the vacuum head, the article can be lifted from the mold by lifting the vacuum head while a blower fan operates through a flexible tube connected to the vacuum head to set up a suction in the vacuum head. A relief opening normally closed by a valve is provided to break the suction so that the article may be deposited on a suitable support. It is necessary to provide the valve with a handle to slide the valve away from the relief opening so that air can enter the vacuum head and relieve the article from the suction.

U.S. Pat. No. 3,004,295 to Paul H. Bottoms, John G. Stansbury and Robert J. Clapp uses suction to hold a flexible, impervious film against the upper surface of a hot blank of plastic material while the bottom surface of the blank is held in curved form against the upper curved surface of a die. In every embodiment of this patent, it is necessary to lift the shaped sheet from the upper surface of the die after vacuum is discontinued.

U.S. Pat. No. 3,279,906 to Robert N. Baker provides apertured press faces for molds that shape glass sheets by press bending. The molds are in the form of air chambers whose front walls are the press faces. The latter have complementary shapes and form a hot glass sheet to such a corresponding shape while engaged between the molds. Air under pressure passes through the apertures in the apertured press faces to provide a thin air film between each mold and the glass sheet during shaping and to chill the glass sheet sufficiently rapidly to impart a temper therein. Tongs grip the glass sheet during its shaping and tempering.

U.S. Pat. No. 3,567,265 to Wendell S. Blanding and Richard F. Kruger uses a vacuum head to remove a shaped article from the upper surface of a mold by first applying vacuum to lift the article off the mold and into contact with fingers and then lifting the head with the article further from the mold. Release of the vacuum permits the release of the article from the vacuum head and its deposit onto a table or platform means.

U.S. Pat. No. 3,634,059 to Richard C. Miller and U.S. Pat. No. 3,607,188 to George W. Stilley and Herbert W. Eilenfeld apply pressure through apertures in a downwardly facing convex shaping surface to help disengage a concavely shaped upper surface of a shaped glass article.

U.S. Pat. No. 3,846,104 to Samuel L. Seymour and U.S. Pat. No. 4,092,141 to Robert G. Frank and DeWitt W. Lampman lift a heat-softened glass sheet into engagement with a vacuum shaping mold having a downwardly facing apertured shaping surface. Vacuum is applied to hold the lifted glass sheet by suction against the downwardly facing shaping surface of the vacuum shaping mold until the lifting means is removed and a transfer ring-like member shaped in elevation and outline to conform to the sheet is moved to a position beneath the vacuum shaping mold. Release of the vacuum drops the shaped glass sheet onto the shaped transfer ring-like member. Sometimes, the shaped glass sheet would deposit in misaligned relation to the ring-like member.

The prior art patents just enumerated fail to provide means at the shaping station to insure that each shaped glass sheet is oriented and aligned on the tempering ring in proper orientation and alignment thereon so that it retains its proper shape while cooling. A misshaped glass sheet that cannot fit into a shaped frame would be rejected by a customer. Furthermore, the need to bend and temper thinner glass sheets (4 millimeters thick or less) than thicknesses handled previously (4.5 to 6 millimeters) makes it desirable to incorporate means to reduce the time required for the apparatus to complete a cycle of bending and tempering, particularly the time needed to transport a heated glass sheet through a shaping station and completely into a cooling station, because thin, hot glass sheets lose their shape more rapidly than thicker glass sheets and also cool more rapidly to a temperature below which it becomes difficult if not impossible to impart an adequate temper in the glass.

Any additional time needed to correct a misalignment between the released shaped glass sheet and the ring-like member would cause the glass sheet to lose its desired shape and limit the degree of maximum temper possible. Since automobile safety is a function of the degree of temper in certain curved tempered windows in the vehicle, it is desirable to maintain the ability of a tempering line to obtain as high a temper as desired in shaped glass sheets of various thicknesses.

SUMMARY OF THE INVENTION

The present invention reduces the time necessary to complete a bending and tempering operation by transferring a shaped glass sheet from a vacuum mold to a ring-like member in such a manner that the likelihood of misalignment between the shaped glass sheet and the ring-like member due to factors involved in releasing the vacuum applied to hold the shaped glass sheet by suction against the downwardly faced apertured shaping surface of the upper vacuum mold is reduced. Essentially, the present invention overcomes the problem of a sheet tilting during its free fall from a shaped wall of an upper vacuum support member to a lower sheet supporting member, which tilting tends to cause misalignments. The lower sheet supporting member is referrred to as a ring-like member in the description that follows.

The present invention is also capable of correcting the orientation as well as misalignment of a glass sheet relative to the ring-like member.

The present invention will be better understood in the light of a description of an illustrative embodiment that follows, which description includes the accompanying drawings wherein like reference numbers refer to like structural elements. It is understood that the apparatus which is to be described as incorporating the illustrative embodiment of the present invention is itself an illustrative embodiment of apparatus that incorporates the present invention and that the present invention may be incorporated in any sheet shaping apparatus that requires suction support of a shaped sheet against an upper vacuum mold having a downwardly facing, shaped surface that is apertured and that drops the shaped sheet onto another shaped supporting surface upon the release of vacuum.

BRIEF DESCRIPTION OF THE DRAWINGS

FIG. 1 is a fragmentary, plan view of apparatus for shaping and tempering glass sheets incorporating a preferred embodiment of the present invention, with certain parts omitted for clarity, showing the relation of the present invention to an illustrative embodiment of apparatus for shaping and tempering glass sheets;

FIG. 2 is a fragmentary, longitudinal view of the embodiment of FIG. 1 with certain parts omitted or broken away or shown in inconsistent positions to show other parts of the apparatus more clearly and with certain positions depicted in phantom consistent with FIG. 1;

DESCRIPTION OF THE PREFERRED EMBODIMENT

Figure 3:
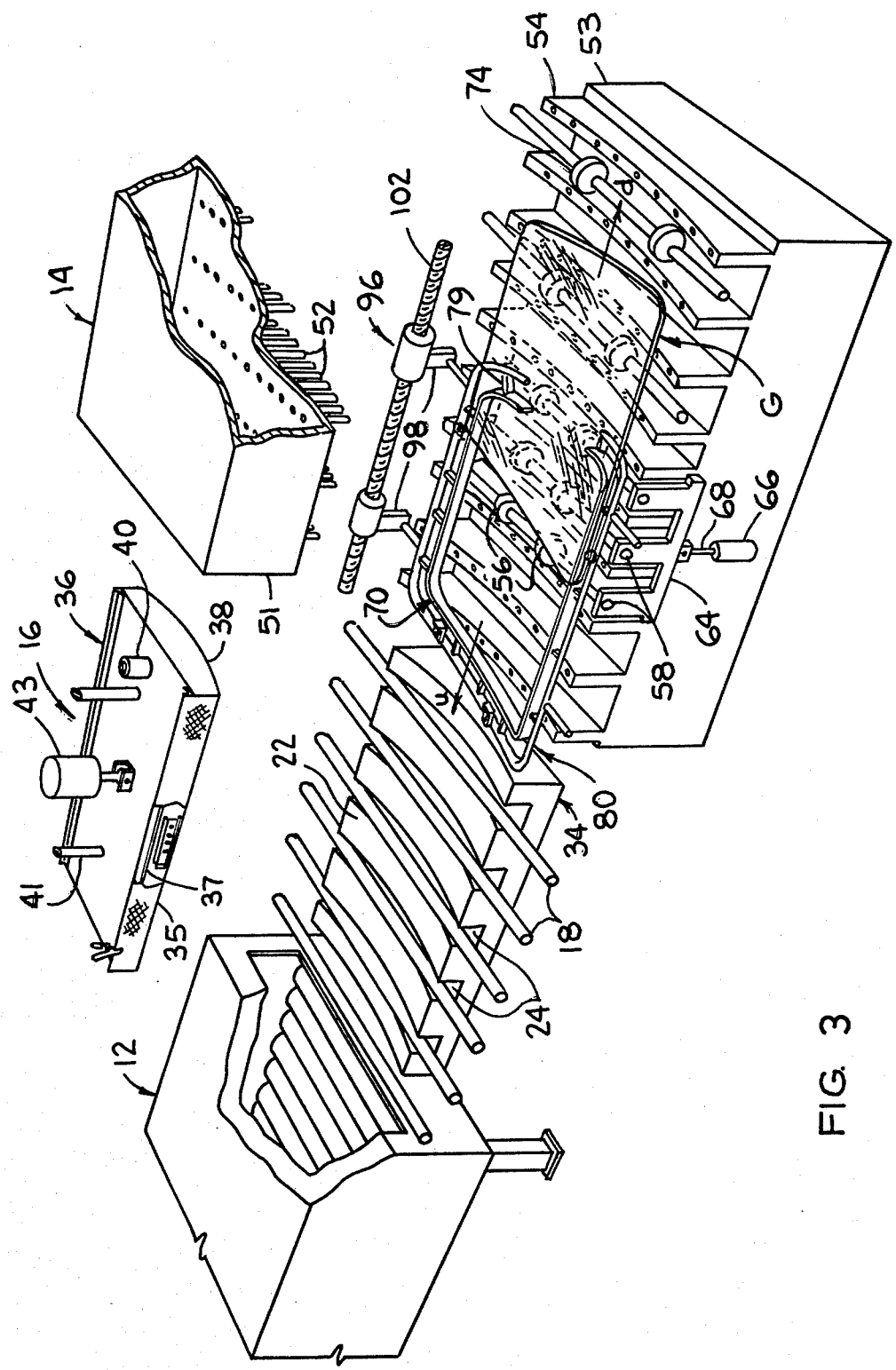
FIG. 3 is a fragmentary, perspective, partly schematic view looking upstream of the apparatus from one side of sheet transfer means forming part of said apparatus, showing a ring-like member returning upstream to a shaping station while a glass sheet moves downstream into a downstream conveyor, with certain parts omitted to show other parts more clearly.

Referring now to FIGS. 1 and 2 of the drawings, an apparatus for treating and shaping sheets of material, such as glass, includes a heating means including a furnace 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A sheet transfer means 17 located in the cooling station 14 transfers the shaped and tempered glass sheet to a downstream conveyor 20 for transport to the unloading station.

Heat may be supplied in the furnace 12 by hot gases from gas burners or by electrical radiant heaters or by a combination of both, which heat supply means are well known in the art. The heating means includes a horizontal conveyor comprising longitudinally spaced, transversely extending conveyor rolls 18 that define a path of travel which extends through the furnace 12 and the shaping station 16. The rolls of the conveyor are arranged in sections and their rotational speed controlled through clutches (not shown) so that the speed of the different conveyor sections may be controlled and synchronized in a manner well known in the art. A glass sensing element S is located beyond the exit of furnace 12 to initiate a cycle of operation of this apparatus.

Limit switches LS-1 through LS-5 are provided to synchronize the operation of various elements of the apparatus according to a predetermined sequence. The glass sensing element S, the limit switches LS-1 through LS-5 and various timer circuits actuated thereby cooperate to provide synchronizing means for the apparatus of the present specification.

The shaping station 16 comprises a lower shaping mold 34 and an upper vacuum shaping mold 36. The latter is composed of metal covered with a refractory material such as fiber glass 35 as is well known in the art. The former comprises an upper surface 22 (FIGS. 3 to 6) conforming in elevational shape to the shape desired for a glass sheet to be bent. The upper surface 22 is interrupted by intermittent transversely extending grooves 24 which provide clearance for raising and lowering the lower shaping mold 34 between a recessed position below the conveyor rolls 18 as depicted in FIGS. 2 and 3, and an upper position above the level of said conveyor rolls (not shown). The lower shaping mold 34 is fixed to a lower mold support 26 and readily detachable therefrom to substitute a mold 34 for a different production pattern.

The upper surface 22 of the lower shaping mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE.

Raising and lowering means in the form of a piston 28 rigidly mounted to a piston support platform 30 raises and lowers support 26 and its attached lower shaping mold 34. Alignment posts 32 are attached to mold support 26 to assure vertical movement of the lower mold 34. A lug 33 is connected to mold 34 to actuate limit switch LS-4.

The upper vacuum mold 36 has an upper mounting plate 37 and a lower wall 38 that is apertured, as well as side walls 39, at least one of the latter being apertured. The lower wall 38 is shaped to be complemental to the shaping surface formed by the upper surface 22 of the lower shaping mold 34. The upper vacuum mold 36 communicates with a source of vacuum (not shown) through an evacuation pipe 40 and a suitable valve (not shown). The upper vacuum mold 36 is suitably connected through upper vertical guide rods 41 to an upper supporting frame 42 and movable relative thereto by an upper vertical piston 43. The upper vacuum mold 36 is readily detached from its upper mounting plate 37 to permit rapid substitution of another upper vacuum mold 36 conforming to a different production pattern. The evacuation pipe 40 may be connected through a suitable valve arrangement to a source of pressurized air (not shown) and the valves for the vacuum line and for the pressure line may be synchronized according to a predetermined time cycle in a manner well known in the art.

Figure 4:
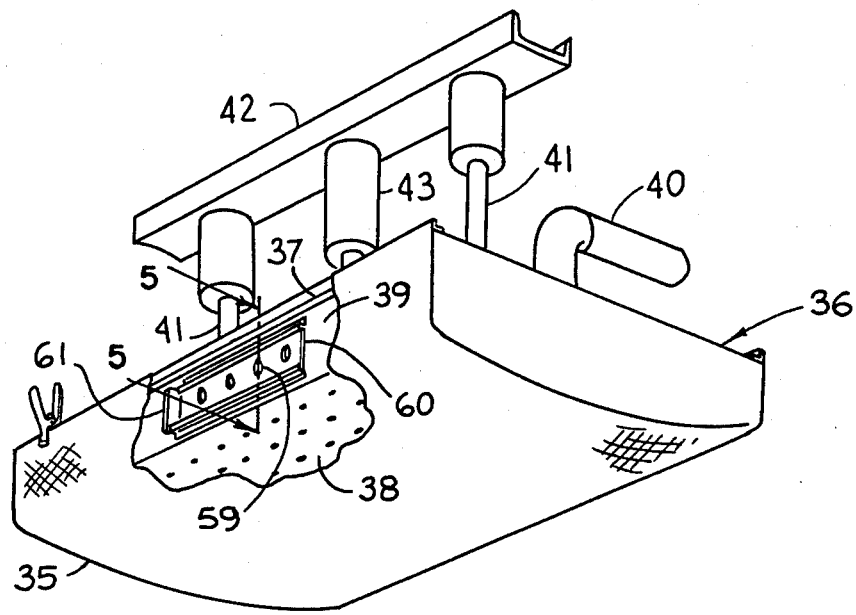
FIG. 4 is a fragmentary perspective view of the upper vacuum shaping mold with certain parts broken away to show other parts more clearly.
Figure 5:
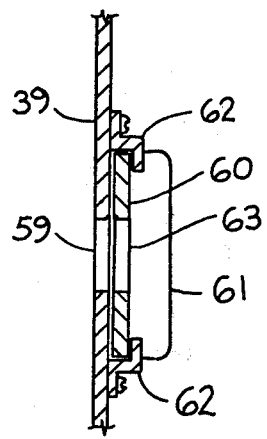
FIG. 5 is a sectional view taken along lines 5—5 of FIG. 4 of a portion of the apertured side wall of the upper vacuum mold, showing an apertured sliding plate with its apertures aligned with the apertures of the apertured side wall for use in handling glass sheets of irregular outline.
Figure 6:
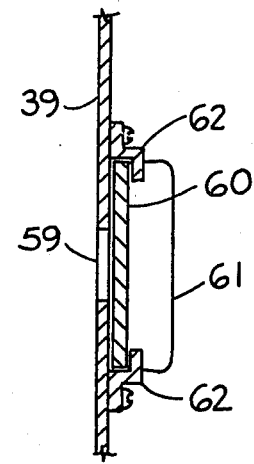
FIG. 6 is a view similar to FIG. 5, showing the apertured sliding plate with its apertures completely offset from the apertures of the apertured side wall of the upper vacuum mold for use in handling glass sheets of rectangular outline.

Any portion of a side wall 39 of the upper vacuum shaping mold 36 that contains apertures 59 is also provided with an apertured slide 60 having a tab 61 at one end thereof (FIGS. 4, 5 and 6). The slide 60 has its longitudinal side portions engaged by a pair of parallel Z-shaped guides 62. The latter are attached along their length to the side wall 39. The tab 61 can move between the Z-shaped guides 62 when the position of the apertured slide 60 is adjusted relative to the apertured side wall 39. The apertured slide 60 has apertures 63 corresponding in size, shape and space therebetween to the arrangement of the apertures 59 in apertured wall 39.

FIG. 5 shows the apertured slide 60 occupying a position in which its apertures 63 are completely aligned with the apertures 59 in apertured side wall 39 to provide a maximum effective open area for the side wall 39. FIG. 6 shows the apertured slide 60 occupying a position in which the apertures 63 face the spaces between the apertures 59 in the side wall 39 so as to enable side wall 39 to behave in the same manner as a continuous side wall with no effective open area. It is understood that the slide 60 may be adjusted in any position in which its apertures 63 are partially aligned with apertures 59 or in which only one or more of its apertures 63 are partially or completely aligned with one or more apertures 59 to provide a desired amount of effective open area in the side wall 39 and means for adjusting the amount of open area as needed.

The reason for providing apertures 59 in at least one of the side walls 39 and an apertured slide 60 therefor is to insure that a glass sheet G drops uniformly onto a ring-like member 70 (to be described later) when the latter is located below the upper vacuum shaping mold without tilting from the orientation at which it is engaged against the apertured lower wall 38 of upper vacuum shaping mold 36 when vacuum is released from the latter. The apertures in the apertured lower wall 38 are made as small as possible to avoid local distortions or dimples in the hot glass sheet supported against the apertured lower wall 38 by suction. When small apertures are uniformly distributed throughout the apertured lower wall 38 and the glass sheets treated have a uniform outline shape, such as an essentially rectangular or circular outline, air under pressure acts uniformly around the perimeter of the glass sheet to cause the latter to drop without tilting onto the ring-like member 70 when vacuum is released in upper vacuum mold 36.

However, when a treated glass sheet has an irregular outline, upon releasing the vacuum, air enters the vacuum chamber of the upper vacuum mold 36 through the small apertures surrounding those that face the shaped glass sheet in such a manner as to cause a temporary pressure gradient within the upper vacuum mold 36. This pressure gradient produces a non-uniform downward thrust against the upper surface of the glass sheet that was previously supported against the apertured lower wall by vacuum. This non-uniform downward thrust causes the released glass sheet to tilt as it drops toward the ring-like member 70. Such tilting may result in misalignment and/or misorientation of the shaped glass sheet relative to the ring-like member 70. Providing additional apertures having an effective open area that can be adjusted for the upper vacuum mold provides relatively rapid inflow of air into the upper vacuum shaping mold that masks the effect of the relatively slow flow of air through the relatively small apertures in the apertured bottom wall 38 to cause the glass sheet to tilt as it drops toward the ring-like member 70.

The relative size of the total effective open area of the apertures 59 and 63 compared to the total area of the apertures in the apertured bottom wall 38 that do not face a glass sheet supported by vacuum thereagainst determines the effectiveness of the apertured slide 60 and apertures 59 in apertured side wall 39 to overcome the tilting tendency. Other factors involved in determining the amount of effective open area of apertures 59 and 63 relative to the total area of the apertures of apertured wall 38 that are exposed when the apertured wall 38 engages a glass sheet that is required to insure a non-tilting transfer of the glass sheet from the upper vacuum shaping mold 36 to the ring-like member 70 include the area, thickness and irregularity of outline shape of the glass sheet pattern being treated.

Increasing the effective open area of aligned openings 59 and 63 reduces the chances of tilting the disengaged glass sheet en route to the ring-like member 70 when the vacuum is released on the upper vacuum shaping mold 36 for any particular glass sheet pattern. However, if the effective open area is made too great, suction apparatus consuming a great amount of energy is required. In the interest of energy conservation, the effective open area of the aligned openings is made as small as possible consistent with the open area necessary to insure a glass sheet transfer without tilting.

The apertures in the apertured lower wall 38 are made as small as possible and are spaced as closely as is necessay to assure vacuum support for a hot glass sheet with reasonable energy consumption. For an upper vacuum mold having a glass sheet engaging apertured lower wall 38 with dimensions 46 inches (117 cm) long and 22 inches (56 cm) wide, apertures having a diameter of 0.09 inches (0.23 cm) and spaced apart from one another 1.5 inches (3.8 cm) in a rectangular or diamond pattern have been found to work adequately in handling glass sheets whose weight is up to 20 pounds (9 Kgm.). Five apertures, each having a diameter of one inch (25.4 mm) spaced apart on 2.2 inch (56 mm) centers are sufficient for the apertured slide 60 and the corresponding row of apertures 59 in side wall 39.

The shaping station 16 also includes a lower platform 44. Vertical posts 46 interconnect the corners of the upper mold supporting frame 42, the piston support platform 30 and the lower platform 44 to provide a unitary structure. Wheels 48 are mounted on the unitary structure to permit the shaping station 16 to be readily removed from a position of alignment between the exit of the furnace 12 and the entrance to the cooling station 14 and an offset position to facilitate maintenance of the structural elements of the shaping station 16.

The cooling station 14 comprises an upper plenum 51 provided with longitudinally spaced transverse rows of transversely spaced pipe nozzles 52 extending downward to direct air applied under pressure to the upper plenum toward the upper surface of a glass sheet that is aligned with the bottom openings of the nozzles. Opposing the upper plenum 51 is a lower plenum 53 provided with lower bar-type nozzle housings 54 disposed with thick walls extending vertically and having elongated openings 55 directed upward through their thickness so that air applied under pressure to the lower plenum 53 is directed upward through the elongated openings 55 against the lower major surface of the glass sheet. The openings of the lower bar-type nozzle housings oppose corresponding openings in the upper pipe nozzles. The bar-type nozzle housings are spaced vertically below the upper pipe nozzles to provide clearance for moving the ring-like member 70 along a path between said upper nozzles and said lower nozzles. The lower ends of the rows of pipes are located along a curved surface complementary to the curved shapes of the upper smooth surfaces of the bar-type housings for the lower nozzles to provide a curved clearance space therebetween conforming to the transverse shape of the glass sheets conveyed therebetween. If desired, the plenums 51 and 53 may be sectionalized along the length of cooling station 14 to provide different air pressures into the various sections of the upper plenum and of the lower plenum so as to provide a program of air blasts along the length of the cooling station 14.

The upper surfaces of the lower bar-type nozzle housings 54 are smoothly surfaced and parallel to one another to provide discontinuous smooth surfaces on which glass cullet is deposited when a glass sheet fractures in the cooling station 14. The lower bar-type nozzle housings 54 are interconnected by a pivotally mounted frame 50 that pivots about an axis extending longitudinally of the length of the cooling station 14. Frame pivoting means 49 is provided to pivot the frame 50, thereby pivoting the smoothly surfaced lower bar-type nozzle housings 54 into an oblique orientation that permits the glass fragments to slide to one side of the cooling station to clear the cooling station of glass fragments rapidly and efficiently. The lower bar-type nozzle housings 54 are returned to their normal position after the fragments of a prior glass sheet have slid to one side of the cooling station and before the next glass sheet is processed. The means to pivot the lower bar-type nozzle housings 54 is similar in construction to that disclosed and claimed in U.S. Pat. No. 3,846,106 to Samuel L. Seymour for pivoting a lower set of nozzles, and the description of said pivoting apparatus is incorporated in the present specification by reference.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The sheet transfer means 17 at the cooling station 14 includes a vertically movable conveyor section comprising a set of doughnut rolls 56 of relatively large diameter mounted on the central portions of thin shafts 58 driven from a gear box and a motor (not shown) mounted on a frame 64. A lug 65 connected to frame 64 actuates limit switch LS-5. Elevator means 66 in the form of one or more pistons is rigidly supported (each with a piston rod 68) on said frame. Vertical guides 69 control movement of the frame 64 in such a manner that when piston rods 68 are extended, the set of doughnut rolls 56 is lifted in unison in a vertical direction into positions where their common upper tangential plane lies in a horizontal plane above the uppermost portion of the shaping surface of the ring-like member 70 to transfer a glass sheet therefrom.

The cooling station 14 also comprises a downstream conveyor 20 comprising additional conveyor shafts 72 downstream of the sheet transfer means 17. Each additional conveyor shaft 72 is provided with a pair of additional doughnut rolls 74 fixed thereto for rotation therewith. The shafts 72 are longitudinally spaced from one another along the length of the downstream conveyor 20 and the additional doughnut rolls 74 are rigidly supported with their common upper tangent occupying a horizontal plane slightly above the uppermost surface of ring-like member 70.

A ring-like member 70 comprises a rail that extends in the form of a ring-like structure disposed edgewise with its width forming the height of the rail. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. Both the ring-like member 70 and reinforcing frame 80 have open portions at their downstream ends.

The reinforcing frame 80 is connected to a carriage 96 through connecting members 97. The carriage 96 is provided with upstanding ears 98 that terminate in internally threaded sleeves 100 that engage a worm drive 102 on each side of the carriage 96. This arrangement guides the movement of the ring-like member 70 between an upstream position at shaping station 16, a downstream position in alignment with sheet transfer means 17 and an intermediate position just downstream of the shaping station. The carriage 96 is reinforced by several arcuate cross braces (not shown) shaped to conform with the transversely curved shape defined by the upper ends of the lower bar-type nozzles 54 and the lower ends of the rows of upper pipe nozzles 52 so as to be capable of moving therebetween.

The doughnut rolls 56 of the shaped glass sheet transfer means 17 are arranged in spaced, parallel rows. At their upper positions, the vertically movable rolls 56 have an upper common tangent in the same horizontal plane as the upper common tangent of the additional doughnut rolls 74. At their lower positions, rolls 56 are located below the path taken by ring-like member 70 and its supporting frame 80.

The worm drive 102 controls the position of the carriage 96 and its supported ring-like member 70 relative to one of the three positions of rest occupied by the ring-like member 70 during a cycle of operation. Limit switches LS-1, LS-2 and LS-3 are provided for actuation by a lug 104 attached to the carriage 96 to control different steps in a cycle of movement of the ring-like member 70.

Cycle of Operation

When a glass sheet G has arrived at a position in the shaping station 16 in spaced alignment between the lower shaping mold 34 and the upper vacuum mold 36, the ring-like member 70 is returning in an upstream direction toward the shaping station 16.

The glass sheet G is then engaged simultaneously between molds 34 and 36, sensing means S having actuated a timer that stops the glass sheet G in a proper position at the shaping station 16 a predetermined time interval after having sensed the presence of a glass sheet passing through the exit of the furnace 12. Vacuum is supplied to the vacuum chamber of upper vacuum mold 36 to hold the shaped glass sheet G against the apertured lower wall 38 of the upper vacuum mold 36 so that the glass sheet will remain in contact with said apertured lower wall 38 when lower shaping mold 34 is retracted. The lower shaping mold 34 has been lifted in response to the sensor S actuating a timer circuit (not shown) that extends the piston 28 on sensing the passage of a glass sheet G into the shaping station 16. Limit switch LS-4 is released by the lifting of mold 34 to actuate the vacuum for upper vacuum mold 36 and to actuate a timer that controls the onset of the return of the lower shaping mold 34 to its recessed position.

Lower shaping mold 34 then retracts, thereby resetting limit switch LS-4, and also retracting the upper vacuum mold 36 with suction still applied to hold the glass sheet thereagainst. The shaping station is now ready to receive the ring-like member 70 into position beneath the upper vacuum mold 36. When lug 104 engages limit switch LS-1, the ring-like member 70 is stopped at its aforesaid upstream position.

At the same time, limit switch LS-1 releases the vacuum in upper vacuum mold 36, thereby permitting glass sheet G to be deposited onto ring-like member 70 when the latter occupies its upstream position.

The glass sheet G supported on the ring-like member 70 is transferred to the cooling station 14 and rapidly transferred from the ring-like member 70 to the downstream conveyor 20. In order to accomplish this end, the doughnut rolls 56 are raised in unison to lift the glass sheet G off the ring-like member 70 while rotating in unison in a direction that propels the glass sheet in a downstream direction.

FIG. 3 shows the cooled glass sheet G transferring from the doughnut rolls 56 of the sheet transfer means 17 in a downstream direction depicted by the arrow d to the doughnut rolls 74 of the downstream conveyor 20 while the ring-like member 70 is simultaneously beginning to return in an upstream direction depicted by the arrow u toward the intermediate position immediately downstream of the shaping station 16 in case a succeeding glass sheet G has not as yet been engaged by suction by the upper vacuum shaping mold 36. The ring-like member 70 moves directly into the upstream position at the shaping station 16 should the succeeding glass sheet be already supported by suction against the upper vacuum mold 36 and the lower shaping mold 34 has moved down to a vertical position sufficiently low to provide clearance for the ring-like member 70 to move to below mold 36 without stopping.

The glass sheet G supported on the ring-like member 70, moves downstream between the upper pipe-type nozzles 52 aligned in transverse rows having convexly curved downward ends and the lower apertured, bar-type nozzle housings 54 having complementary, concavely curved upper surfaces and air is blasted through the nozzles 52 and 54. The doughnut rolls 56 and their thin shafts 58 at sheet transfer means 17 remain in the downward retracted position with frame 64 being retracted downwardly by the retraction of the piston rod 68 actuated by elevator means 66 while awaiting the arrival of the ring-like member 70 into position wherein lug 104 engages limit switch LS-2.

By the time the worm drive 102 has driven carriage 96 and its supported ring-like member 70 part-way into the sheet transfer means 17, a timer circuit actuated by lug 104 engaging limit switch LS-2 in the downstream direction has caused the elevator means 66 to raise the piston rod 68, thereby lifting frame 64, shafts 58 and rotating doughnut rolls 56 into intermediate positions approaching the level at which they lift the glass sheet G off the ring-like member 70. This upward movement releases limit switch LS-5, thereby causing doughnut rolls 56 to start to rotate.

When the ring-like member 70 has arrived at its most downstream position where lug 104 has engaged limit switch LS-3 to stop the worm drive 102, the rotating doughnut rolls 56 have begun to transfer the glass sheet G over the ring-like member 70 and its open-ended reinforcing frame 80 toward the most upstream doughnut roll 74 of the downstream conveyor 20. The piston rod 68 remains fully extended as the glass sheet G continues to move downstream further into the downstream conveyor 20.

Before the trailing edge of the glass sheet G has cleared the open downstream end of the ring-like member 70, the worm drive 102 has begun to move the ring-like member upstream toward the shaping station 16. A timer actuated by limit switch LS-3 controls the onset of the reverse rotation of the worm drive 102 that controls the return movement of the ring-like member 70 in an upstream direction.

When the rolls 56 have transferred the glass sheet G to the doughnut rollers 74 fixed to additional conveyor shafts 72 of the downstream conveyor 20, another timer circuit controlled by limit switch LS-3 causes the elevator means 66 to start to retract the piston rods 68, thereby lowering the doughnut rolls 56 and their thin shafts 58. Previously, the lowering of lifting frame 64 to its recessed position actuated limit switch LS-5, which caused the worm drive to move the carriage 96 in an upstream direction into a position where lug 104 engaged limit switch LS-1, thereby permitting ring-like member 70 to be in its intermediate position to await the completion of the shaping of a succeeding glass sheet which is indicated by the resetting of limit switch LS-4 when lower shaping mold 34 retracts. However, if the apparatus operates rapidly enough, as indicated by the time-out of a timer circuit whose time starts by a subsequent actuation of sensing means S, the reset limit switch LS-4 permits ring-like member 70 to move upstream through the intermediate position without stopping at the intermediate position.

During the time that the ring-like member moves into or through the intermediate position controlled by the engagement of lug 104 against limit switch LS-2, lower shaping mold 34 remains retracted sufficiently to provide clearance for the succeeding glass sheet G to enter into a position of alignment between the upper vacuum mold 36 and the lower shaping mold 34.

It is preferred that the thin shafts 58 on which the doughnut rolls 56 are mounted be rotating when the set of rolls 56 is lifted into position above that occupied by the lower surface of the glass sheet G resting on the ring-like member 70. The rolls 56 may rotate continuously or intermittently. In the latter case, it is imperative that the rolls 56 rotate during the portion of their cycle of vertical movement when they engage the lower surface of a glass sheet being transferred.

In order to avoid marking the glass during its transfer from the set of doughnut rolls 56 to the rotating additional doughnut rollers 74 fixed for rotation to the additional conveyor shafts 72, the peripheral speed of the vertically movable rolls 56 located at the sheet transfer means 17 is equal to the peripheral speed of the doughnut rollers 74 of the downstream conveyor 20. In addition, the glass sheet G is cooled rapidly enough while resting on the ring-like member 70 to at least harden its surfaces sufficiently to enable the latter to withstand rolling contact with said rotating rolls 56 without developing substantial surface defects that would cause the resulting glass articles to be rejected by a customer. Preferably, the cooling is performed at a rate sufficient to impart at least a partial temper to the glass sheet before lifting the latter onto said rotating rolls.

Glass sheets of non-rectangular outline transported along a long roller conveyor extending through a furnace tend to become misaligned and misoriented. However, the orientation and alignment of glass sheets may be readily corrected by using the method and apparatus for orienting and aligning glass sheets adjacent to the downstream exit of the furnace described and claimed in U.S. Pat. No. 4,058,200 to Robert G. Frank.

Important benefits derived from the described apparatus is the rapid transfer of each glass sheet G from the frame-like member 70 onto the doughnut rolls 74 of the downstream conveyor 20 via the upwardly moving doughnut rolls 56 of the sheet transfer means 17, the more rapid return of the ring-like member 70 to the shaping station 16, the more accurate positioning of each successive glass sheet on the ring-like member 70 and the ability of the ring-like member 70 to move downstream from the shaping station 16 to the sheet transfer means 17 as rapidly as possible while assuring proper orientation and alignment of the glass sheet. In prior art apparatus, too rapid a transfer caused misalignment of the glass sheet and consequent misshaping.

The present invention permits each glass sheet in a series of sheets to be conveyed on a relatively inexpensive roller-type conveyor while it is heated to its deformation temperature, has its orientation and alignment corrected a short distance upstream of the shaping station, shaped to the desired configuration at the shaping station 16 using complementary shaping molds that are readily replaceable with molds conforming to different families of production patterns, readily transferred to a position of support by vacuum against the upper vacuum shaping mold 36 while the lower shaping mold 34 is retracted and the ring-like member 70 is introduced into a position aligned below upper vacuum shaping mold 36. The shaped glass sheet G is deposited in non-tilting relation onto the outline support surface provided by the ring-like member so that the shaped glass sheet G is supported adjacent its marginal edge only on said ring-like member in proper alignment and orientation relative to said ring-like member so that its upper and lower major surfaces are exposed to blasts of cool tempering medium, such as air or any other suitable well-known tempering medium, during the conveyance of the shaped glass sheet G to the sheet transfer means 17 that transfers the shaped and tempered glass sheet G to a downstream conveyor that leads to an unloading station. The provision in side wall 39 of additional holes of adjustable size larger than the total area of the apertures provided in the lower apertured wall 38 of the upper vacuum shaping mold 36 facilitates the non-tilted deposit of the shaped glass sheet onto the ring-like member 70.

The form of the invention shown and described in this disclosure represents an illustrative preferred embodiment thereof. It is understood that various changes may be made in the structure and method of operation without departing from the gist of the invention except insofar as defined in the claimed subject matter that follows.

I claim:

1. Apparatus for shaping glass sheets comprising:
   glass sheet retaining vacuum means having an enclosed chamber in communication with a source of vacuum, an apertured glass-engaging wall defining one side of the chamber, the remainder of the chamber being defined by housing walls in non-glass-engaging portions of the glass sheet retaining means, at least one opening in the non-glass-engaging housing walls communicating the chamber with the atmosphere, the total effective area of said housing opening or openings being sufficiently great relative to the area of apertures in the glass-engaging wall to provide rapid release of vacuum from the chamber through said housing opening or openings upon shut-off of vacuum from the chamber so that a glass sheet retained on the glass-engaging wall by vacuum may separate substantially uniformly therefrom, and bending means coacting with the glass sheet retaining means for shaping a glass sheet.

2. The apparatus of claim 1 wherein the apertured glass-engaging wall is downwardly facing on the underside of the glass sheet retaining vacuum means and is curved in correspondence to the curve desired to be imparted to the glass sheets, and the bending means comprises a lower bending mold vertically aligned beneath the apertured glass-engaging wall and having upwardly facing glass shaping surfaces of complementary curvature to the apertured glass-engaging wall, further including vertical reciprocating means for bringing the glass sheet retaining vacuum means and the lower shaping mold into and out of close proximity to one another so as to press a glass sheet therebetween.

3. The apparatus of claim 1 or 2 further including a ring-like glass receiving member and means associated therewith to convey the ring-like member into a position beneath the glass sheet retaining vacuum means so as to receive a bent glass sheet released therefrom.

4. The apparatus of claim 1 wherein at least one of the openings in the housing walls is provided with valve means for varying the flow of air therethrough.

5. The apparatus of claim 4 wherein the valve means comprise a plate slidably mounted on a housing wall so as to variably block the openings in the housing walls.

6. The apparatus of claim 1 wherein said housing openings include an opening whose area is geater than the average area of the apertures in the apertured glass-engaging wall.

7. The apparatus of claim 6 wherein the apertures in the apertured glass engaging wall are substantially uniformly spaced throughout the extent of the apertured glass-engaging wall and are of substantially uniform area.

8. The apparatus of claim 1 wherein the apertured glass-engaging wall has an area greater than that of each glass sheet being shaped.

* * * * *